United States Patent [19]

Fleischer et al.

[11] 3,840,278

[45] Oct. 8, 1974

[54] PRESSURE FLUID VEHICLE BRAKE ANTI-LOCK SYSTEM WITH INDEPENDENT RIGHT-LEFT CONTROL

[75] Inventors: Helmut Fleischer, Schwieberdingen; Eberhard Schnaibel, Hemmingen, both of Germany

[73] Assignee: Robert Bosch GmbH, Stuttgart, Germany

[22] Filed: June 21, 1973

[21] Appl. No.: 371,994

[30] Foreign Application Priority Data
June 26, 1972 Germany.............................. 2231166

[52] U.S. Cl. ...... 303/21 EB, 303/21 AF, 303/21 BE
[51] Int. Cl............................................. B60a 8/12
[58] Field of Search............... 180/82 R; 188/181 A; 303/20, 21; 317/5; 324/162; 340/53, 262, 62

[56] References Cited
UNITED STATES PATENTS

| | | | |
|---|---|---|---|
| 3,260,555 | 7/1966 | Packer............................ | 303/21 EB |
| 3,498,683 | 3/1970 | Leiber............................ | 303/21 BE |
| 3,540,779 | 11/1970 | Marouby........................ | 303/21 BE |
| 3,606,491 | 9/1971 | Walsh............................. | 303/21 AF |
| 3,637,264 | 1/1972 | Leiber et al. .................. | 303/21 BE |
| 3,652,137 | 3/1972 | Fink et al...................... | 303/21 CG |
| 3,713,705 | 1/1973 | Michellone et al............ | 303/21 P |
| 3,756,663 | 9/1973 | Fink et al...................... | 303/21 BE |
| 3,767,270 | 10/1973 | Urban............................ | 303/21 BE |

Primary Examiner—Trygve M. Blix
Assistant Examiner—Stephen G. Kunin
Attorney, Agent, or Firm—Flynn & Frishauf

[57] ABSTRACT

To prevent excessive yaw torques if the road condition differs beneath the sides of the vehicle, in a vehicle brake anti-lock system which has wheel acceleration and deceleration sensors, separately and respectively associated with the wheels on the right, and left side of the vehicle, an interlock is provided which permits only gradual pressure rise on the brake cylinders of the wheels on both sides if the anti-lock system on one side has responded; typically, a pulse source is provided gradually, by pulsed interruption, increasing wheel braking effort after the anti-lock system has responded by response of the wheel deceleration sensor, this gradual increase controlling the application of pressurized brake fluid to brakes at both sides of the vehicle.

18 Claims, 5 Drawing Figures

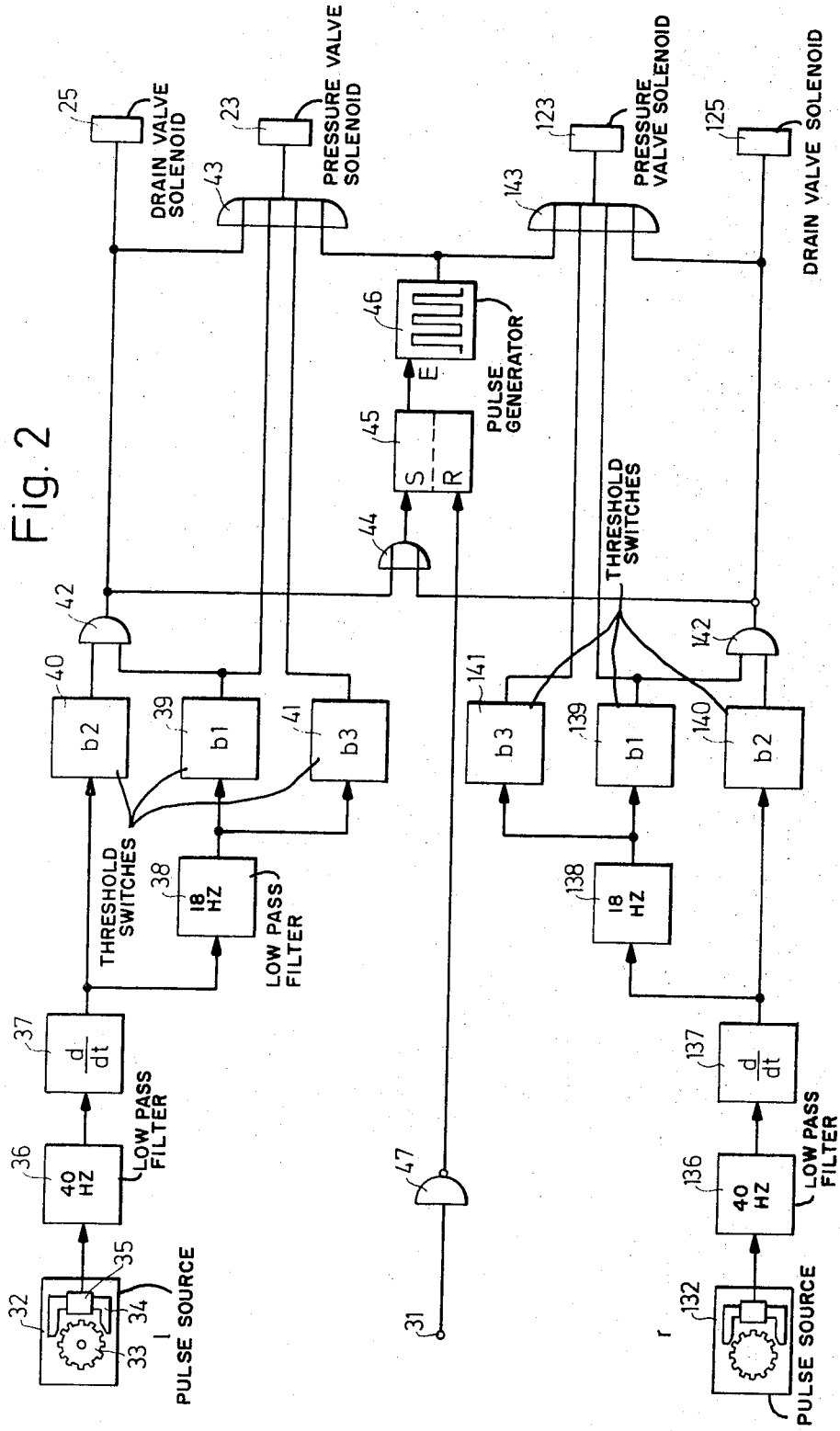

| Threshold Switch | ON-level | OFF-level | Signal when ON |
|---|---|---|---|
| 39 (b1) | − 3g | + 1g | 1 |
| 40 (b2) | 0g | + 1g | 0 |
| 41 (b3) | + 0.9g | 0g | 1 |

Fig. 4

| Circumferential Wheel Acceleration | b1 | b2 | b3 | Inlet Valve 23 | Drain Valve 25 | Pressure |
|---|---|---|---|---|---|---|
| − 1.0g | 0 | 1 | 0 | 0 | 0 | Rise |
| − 3.5g | 1 | 1 | 0 | 1 | 1 | Drop |
| + 0.5g | 1 | 0 | 0 | 1 | 0 | Constant |
| + 1.1g | 0 | 1 | 1 | 1 | 0 | Constant |
| − 1.0g | 0 | 1 | 0 | Pulsed | 0 | Slow Rise |

Fig. 5

PRESSURE FLUID VEHICLE BRAKE ANTI-LOCK SYSTEM WITH INDEPENDENT RIGHT-LEFT CONTROL

Cross reference to related applications:
U.S. Ser. No. 330,674, filed Feb. 8, 1973
U.S. Ser. No. 328,047, filed Jan. 30, 1973
U.S. Ser. No. 325,569, filed Jan. 22, 1973.

The present invention relates to a vehicle brake anti-lock system and more particularly to an automotive brake anti-lock system in which sensors are provided which control bleeding valves to bleed pressurized brake fluid from a pressurized braking line in case locking, or imminent locking of a wheel is being sensed.

Various types of vehicle anti-lock systems have been proposed, see, for example the cross referenced applications. Inlet and outlet valves are controlled by an operator who controls vehicle braking. The operator may control the braking pressure as such, or the supply of pressurized fluid through selective operation of inlet and outlet valves. The automatic vehicle anti-lock system provides supervisory or additional control for the inlet and outlet valves, to provide for increased brake fluid pressure, constant brake fluid pressure at an even level, or to drop brake fluid pressure.

Vehicle wheel acceleration sensing devices control the selective application of brake fluid under pressure, holding the pressure constant or bleeding brake fluid. Upon excessive wheel acceleration, the brake fluid pressure is lowered. If, in a subsequent control cycle, the acceleration sensor senses a lesser wheel acceleration, it has been proposed to provide a pulse source, or the like, which permits only intermittent opening of pressurized brake fluid valves. Thus, after a wheel has locked, or almost locked, brake fluid pressure can rise only slowly thereafter. Such slow subsequent rise of brake fluid pressure prevents rapid re-acceleration of a vehicle wheel on slippery or slick roads, which might cause additional locking of the wheel. At the same time, cyclical repetition rate and the control amplitude of the vehicle wheel anti-lock system are decreased.

The anti-lock system as desccribed permits excellent matching of brake fluid pressure, and thus of braking effort, to the condition of the road on which the wheel is operating. Due to the comparatively low control frequency and amplitudes, the vehicle itself is braked smoothly, even under emergency conditions, so that braking shocks and vibrations are hardly noticed, which might be caused otherwise by the periodic change between wheel deceleration and wheel acceleration. This ensures optimum safety and comfort for the operator and vehicle passengers, even under emergency braking conditions.

It has been found that difficulties arise if the road surface presents a non-symmetrical conditions to the wheels. A non-symmetrical condition will arise, for example, during atmospheric precipitation conditions; for example when it is raining, the vehicle may operate with its left track on wet road, with its right track, however, through an extended water puddle. The wheels on the right track will then be able to supply only little braking effort. Selectively different frictional conditions between wheel and road become even more dangerous if a portion, that is one side of the road surface is iced, and another side of the road surface is dry, or only slightly slippery.

Vehicle wheel anti-lock systems have been proposed in which each wheel has its own separate control network and acceleration sensor, as well as its own control inlet and outlet valves (when both inlet and outlet valves are closed, even braking pressure is maintained, so that two valves provide three-condition operation). If the referred-to non-symmetrical road conditions arise, the anti-lock control systems decrease braking pressure at the right (or slippery) side very rapidly, whereas the wheels of the left (or gripping) side will transfer full braking effort to the road surface, without locking. This results in yaw, or slew to the left, about the vehicle central axis (wherein the term "yaw" or "slew" is utilized in the same sense as in aircraft or marine terminology).

The yaw moment, or yaw torque, has the tendency to drive the vehicle in a curve to the left, that is, to the side where the wheel has good road grip. If the inherent tendency of the wheels, or the steering effort transferred by the operator to the wheels on the wheels at the left side of the vehicle is not sufficient to overcome the yaw, then the vehicle will be thrown into a skid, regardless of the wheel anti-lock system. Even if the wheel toe-in is sufficient to overcome the non-symmetry, the operator will notice a substantial pull to the left which has to be compensated for by compensatory steering and force on the steering wheel.

It is an object of the present invention to provide a vehicle wheel brake anti-lock system which compensates substantially, if not wholly for non-symmetric road conditions, with respect to the wheels, and in which the operator, even under emergency braking conditions, is assisted in his efforts to counteract non-symmetrical braking effort transferred between the wheels on one side of the vehicle and the road surface.

Subject matter of the present invention

Briefly, the vehicle is so constructed that it has at least two separately controlled brakes, or braking systems, which are located at relatively opposite sides of the vehicle side, that is, are associated with the left and right wheels respectively. A common pulse source is provided for both brakes. Two vehicle wheel acceleration sensing devices are provided one for each side of the vehicle, which control the common pulse source, which also controls two pressure fluid inlet valves. Since the pulse source is controlled by two acceleration sensors, sensing wheel acceleration at opposite sides of the vehicle, the braking system on one vehicle side will have wheel braking pressure applied only slowly, even if only a wheel on the other side has begun to block. At the side of the vehicle where better road conditions prevail, e.g. a dry side of the road, braking pressure will increase at a lesser rate than theoretically permissible. Since the braking effort at that side of the vehicle rises only slowly, corresponding to a rise in braking pressure on the right (i.e. wet) side of the vehicle, the yaw torque will increase slowly, easily permitting counter steering. This increases the braking distance somewhat on a non-symmetrical road; this minor disadvantage is, however, more than outweighed by the improved directional stability of the vehicle. If the road surface is essentially symmetrical, all the advantages of the known wheel anti-lock systems, including the decrease in braking distance, are completely maintained.

Brief description of the drawings

FIG. 2 is a generally schematic block circuit diagram of the brake anti-lock system associated with two wheels;

FIG. 4 is a table of acceleration values and resultant signals in the circuit of FIG. 2; and FIG. 5 is a table of signals in the circuit of FIG. 2 and resulting braking effects.

The present invention is equally applicable to a vehicle wheel brake control system in which the braking pressure is directly derived from brake fluid pressurized by an operator, and FIG. 1 illustrates a system in which a master brake cylinder 10 has a piston 11 located therein, operated by a piston rod 12 under control of the brake pedal of the operator, a power brake system, or the like. The master cylinder 10 provides pressurized brake fluid over a main brake line 13 to an inlet valve 14, which connects pressurized brake fluid through the wheel brake line 15 to a wheel brake cylinder 16 in which a wheel brake operating piston 17 is located in order to move the brake shoes or brake pads of the wheel braking system of the associated vehicle wheel.

Figure 1:
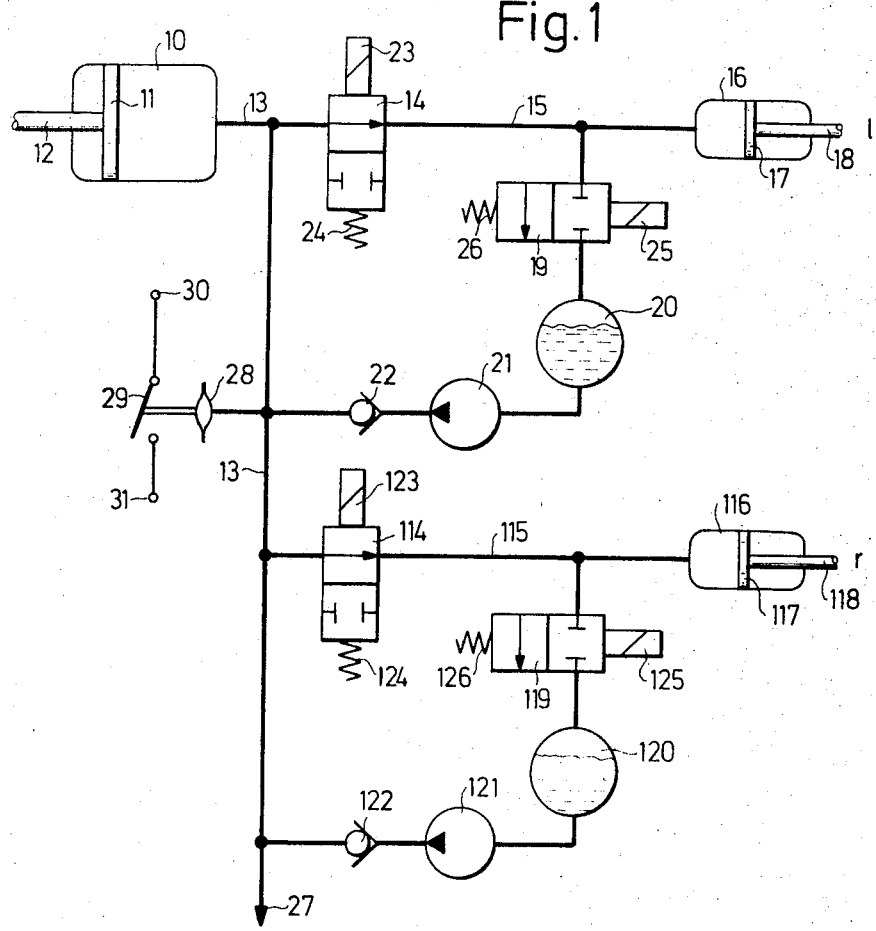
FIG. 1 is a generally schematic diagram of the hydraulic arrangement of the wheel anti-lock system.

The wheel brake line 15 is connected over a drain valve 19 to a sump or reservoir 20 in which brake fluid is collected, which is removed from the wheel brake cylinder 16. A re-circulating pump 21 provides brake fluid from sump 20 over check valve 22 back to the main brake line 13 connected to the master cylinder 10.

The inlet valve 14 is controlled by a magnet winding 23, and maintained in its normal position, as shown, by a spring 24. The inlet valve 14 is a two/two way valve and, in its quiescent or normal position, provides for free communication of pressurized fluid from the main brake line 13, and master cylinder 10, to the wheel brake line 15. When energized by coil 23, the valve moves into a blocking condition, interrupting fluid communication between lines 13 annd 15.

The drain valve 19 is reversely connected. It is operated by a magnet winding or solenoid 25 and maintained by a spring 26 in its quiescent position, in which it interrupts fluid communication from brake line 15 to sump 20. When solenoid 25 is energized, the valve opens the path between line 15 and reservoir or sump 20.

The components sofar described are associated with the left wheel of the vehicle, as indicated by the letter *l* in FIG. 1. An exactly identical system is provided for the right vehicle side (indicated by the letter *r*). The reference numerals for the right side are identical with those for the left, incremented by 100.

A pressure sensor 28 is connected to the common or master brake line 13 which operates a brake light switch 29, connected between terminals 30, 31. When the brake light switch 29 is closed, a supply source connected to terminal 30 is then connected through the switch to terminal 31, to supply brake indicator lights with current.

A connection 27 is indicated further in FIG. 1, which may be connected to further wheel anti-lock systems not shown.

If desired, the brake line 13 may be sectionalized and controlled by two master cylinders 10, operated together; the operation of the system will not change, the only difference being that each section of the brake line 13, and with it a vehicle brake system provided, for example, for two wheels on one side, will be supplied with pressurized brake fluid independently of the other so that, should one line brake fail, the other line would still be operative.

Basic operation

In normal operation of the vehicle and without application of brakes, the system is in the position shown in FIG. 1. The brake light switch 29 is open. Upon operation of the brake pedal, brake light switch 29 closes, and additionally pressurized brake fluid can pass from the master brake cylinder (or cylinders) 10 to each one of the wheel brake cylinders 16. Pressure in the wheel brake cylinders 16 will equalize to the pressure in the master cylinder 10. This corresponds to an initial rise in brake fluid pressure. If the brake fluid pressure is held at a constant value, solenoid 23 of inlet valve 14 is energized, so that both valves 14 and 19 will be closed. This inhibits rise of further brake fluid pressure to the wheel cylinder 16, while also preventing pressure loss by flow of fluid through valve 19. If the pressure of the brake fluid is to be lowered, inlet valve 15 will remain closed or blocked and outlet or bleeder valve 19 will be changed to its operated condition by energization of solenoid 25 to permit pressurized brake fluid to drain into sump 20. At each control cycle, some brake fluid will flow from the pressure cylinder 16 into the sump 20 during the pressure lowering phase or part of the control cycle. The master cylinder 10, and line 13, would slowly be drained of all brake fluid; the supply pump 21, in series with check valve 22, provides brake fluid for the master cylinder and line 13. It constantly supplies brake fluid which has collected in reservoir 20 back to the master cylinder 10 and the main brake line 13.

A fourth possible combination of the position of the two valves 14, 19 must be prevented by an electrical or mechanical interlock, namely opening of valve 19 with valve 14 likewise open (solenoid 25 energized, solenoid 23 deenergized). This would, in effect, cause circulation of the pressure fluid directly from the master brake cylinder 10 into the summp 20, rapidly draining the master cylinder 10. The circuit of FIG. 2 includes an interlock portion which excludes this particular possibility.

Putting pressure on master cylinder 10 will, of course, have an identical effect with respect to the wheel cylinder 116, and the foregoing explanation is equally applicable to the right wheel cylinder, and the system including the components incremented by 100, with respect to those explained.

Details of system, FIG. 2

Two anti-lock systems, *l, r* are shown. One of these systems is associated with a wheel on the left side, and the other with the wheel on the right side, and to the extent that the elements are identical, have been given the same last two digits of the reference numerals.

The *l* system has an input pulse source 32 which, basically, is a pulse-type tachometer generator including a toothed wheel 33 having ferromagnetic teeth which are opposed by a yoke 34 over which a coil 35 is wound. The output of the coil is connected to the input of a first low-pass filter 36, which, in a typical example, has an upper limit frequency of about 40 Hz. A differentiator 37 is connected to the low-pass filter 36, to which a further second low-pass filter 38 is connected which, in an example, has an upper limit frequency of about 18 Hz.

Three threshold switches 39, 40, 41 are provided, the first (39) and the third (41) being commonly connected to the output of low-pass filter 38. The three threshold switches, together with elements 32–38 form an acceleration sensing system which is used to determine circumferential wheel acceleration (or its negative, deceleration). The input of the second threshold switch 40 is connected directly to the output of differentiator 37. The outputs of the first and second threshold switches 39, 40 are connected to the input of an AND-gate 42, the output of which is connected to the input of solenoid coil 25, which operates the outlet or drain valve 19. An AND-gate 43 has the outputs of the AND-gate 42 connected thereto, as well as the outputs of the first and third threshold switches 39, 41 and the output of a pulse source 46, to be described. The output of the OR-gate 43 is connected to the solenoid coil 23 which operates the inlet or pressure valve 14 to close the pressure valve and inhibit application of pressurized brake fluid if solenoid 213 is energized.

The right system, in which the components have reference numerals incremented by 100, is identical.

The outputs of the two AND-gates 42, 142, and thus also the inputs to the drain solenoids 25, 125, are additionally connected to the inputs of an OR-gate 44 which is connected to the set input S of a bistable flip-flop 45. The output of the bistable flip-flop 45 is connected to a blocking input E of a pulse source 46, which is normally energized, or operating. The pulse source 46 may be, for example, an astable multivibrator having two transistors, or the like. One of the transistors may have its base connected to the input E, so that the base connection may serve as a blocking input, inhibiting operation of the circuit of element 46. The two OR-gates 43, 143 are commonly connected to the output of multivibrator 46. The re-set input R of the bistable flip-flop 45 is connected through an inverter 47 to the terminal 31 of the brake light switch 29.

Operation of anti-lock system of FIG. 2

Tachometer pulse generator 32 provides output pulses synchronized with wheel rotation, since upon rotation of the toothed wheel 33, the magnetic reluctance path between wheel 33 and yoke 34 will change periodically, inducing a voltage in coil 35, of a frequency representative of speed of the wheel, and with it circumferential speed thereof. An output amplifier would normally be connected between coil 35 and the input to the low-pass filter 36, which may include an inverter stage, for example a monostable multivibrator to transform the output pulses from coil 46 into suitably wave-shaped pulses of uniform pulse amplitude and pulse duration. The low-pass filter 36 forms an average value, with respect to time, of the output of tachometer generator 32. The output from filter 36 thus is a direct current, or direct voltage, having an amplitude representative of vehicle wheel circumferential speed. This output signal is applied to differentiator 37, to be therein differentiated and derive a differentiated signal representative of the rate of change of the speed signal. The output from differentiator 37 is thus a signal representative of circumferential wheel acceleration, or deceleration.

Wheel rate of change will be considered to be negative when the wheel decelerates, and positive upon acceleration. As reference for the rate of change, gravity will be used, that is the approximate relationship of: 1 $g = 10$ m/s$^2$. Use of gravity as a unit for acceleration is suitable since it has been found, by experience, that braking a vehicle on dry road can result in maximum deceleration (negative acceleration) of $-1g$, without locking of the wheels. In the explanation that follows, terminology customary in digital circuitry will be used, that is, a 1-signal will be representative of an output at positive voltage, and a 0-signal will be representative of output at chassis, or ground potential, or at a negative polarity.

FIG. 4 illustrates the switching thresholds and the signals derived from the three threshold switches 39–41. These threshold values are examples only and may be selected to be different for different types of vehicles. They would be suitable for a vehicle of intermediate weight and size, for example of approximately 1,500 kg; and about 2¾ to 3 m wheel base.

The first column of FIG. 4 lists the respective threshold switches 39–41, having threshold levels b1 to b3. As can be seen from the second and third columns, the threshold switches have a certain switching hysteresis. Switching-ON level must therefore be distinguished from the switching-OFF level. The signals which are obtained from the threshold switches are then indicated in the last column. The use of the table in FIG.4 will be explained in connection with the first threshold switch 39. In its quiescent condition, that is, when the threshold level of $-3g$ is not exceeded (that is, the wheel is not tending to lock), the output signal will be a 0-signal. Ordinary braking, in which rolling friction between wheel and road pertains, that is, without locking, would cause a deceleration of between 0g and $-1g$. Upon incipient locking, the wheel will rapidly decelerate and the threshold level b1 of $-3g$ will be passed in a negative direction. The output signal will change to 1. The anti-lock control system will respond and brake fluid pressure will drop. This causes the wheel to accelerate with respect to the previous deceleration, and wheel acceleration changes with decreasing brake pressure in positive direction. The first threshold switch, due to a switching hysteresis, however, continues to have a 1-signal at its output, even when the wheel deceleration is less than $-3g$, that is becomes positive with respect to the value of $-3g$. Only when the level of $+1g$ is exceeded will the switch change state and again provide the normal quiescent 0-signal at its output.

The control cycle of the anti-lock system is delineated in the table of FIG. 5. In the first column, the various values of wheel deceleration are noted, which would obtain when a driven vehicle has a brake applied thereto. The next three columns indicate the output signals from the respective threshold switches having the threshold levels b1, b2, b3 respectively, the fifth and sixth columns illustrate the application of signals to the solenoid windings 23, 25 and the last column gives the explanatory result with respect to the brake itself.

Referring to FIG. 5

Upon first applying the brake, the vehicle deceleration and circumferential wheel deceleration are about equal, that is, $-1g$. The three threshold switches 39 to 41 are in their quiescent condition (FIG. 4) and provide these output signals, in this sequence: 0; 1; 0. The input of AND-gate 42 has only one 1-signal applied thereto, so that its output will be a 0-signal at the input to the solenoid winding 25. Bistable FF 45 is still in its quiescent state, providing a 0-signal to the blocking input E of the pulse source or generator 46. Pulse source 46 thereby is blocked and provides a 0-signal to the OR-gate 43. All inputs of the OR-gate 43, therefore, have 0-signals, and as a result the solenoid winding 23 of inlet valve 14 has a 0-signal applied thereto so that both valves 14, 19 are in their quiescent position, that is, valve 14 open, valve 19 closed. Braking fluid pressure can further increase.

Let it be assumed that the application of braking force to the brake controller, that is for example the brake pedal is so heavy that the vehicle wheel is brought to locking state. Upon beginning of locking, the vehicle wheel deceleration will rapidly change in negative direction and will pass the threshold limit of the first threshold switch 39, in the present example set at $-3g$. The resultant signals are found in the second line of FIG. 5.

Let it be assumed that the vehicle wheel is decelerated to $-3.5g$. The output signals of the three threshold switches now have this configuration: 1; 1; 0. The first and second threshold swtiches 39, 40 deliver a 1-signal, AND-gate 42 has all inputs at a 1-signal and delivers and output 1-signal to OR-gate 43. This enables the OR-gate 43 and opens the drain valve 23, simultaneously energizing the solenoid 25 to close the inlet supply valve. Brake fluid may now drain from the wheel brake cylinder 16 and the pressure will drop. The connection between the output of AND-gate 42 to the input of the OR-gate 43 forms the interlock circuit which was above referred to, that is: upon energization of the solenoid 25 of drain valve 19, automatically, the solenoid 23 of inlet valve 14 is also energized. It is thus not possible to have simultaneously the inlet valve and the outlet valves 14, 19, respectively, in open condition.

Upon energization of the two valves 14, 19, that is, when AND-gate 42 has a 1-output, OR-gate 44 will transfer the 1-output to the set input S of bistable FF 45, which will change to its second steady state to provide a 1-signal to the blocking input E of the pulse source 46. Pulse source 46 thus will be unblocked, and provide pulses in accordance with its predetermined repetition rate to the OR-gate 43. At this stage of operation, the pulses are not effective since the interruption period between the pulses is bridged by the energization of the OR-gate directly from AND-gate 42, so that OR-gate 43 is continuously enabled anyway.

The first threshold switch 139 of the right, or second anti-lock system r may not yet have responded. The output signals of source 46 will then be applied to the OR-gate 143 to control the winding 123 of valve 114. As a result, the second anti-lock system r can have braking pressure applied only gradually, that is, in pulsed steps, although the road surface beneath the right wheel may still have sufficient friction so that the wheel could not lock. This effect of the operation of the system, however, avoids too rapid increase of braking effort at the right side of the vehicle, whereas simultaneously the left side of the vehicle has braking effort decreased by drop in the braking pressure. Thus, the torque resulting in yaw of the vehicle rises only slowly towards its limiting value.

A practical example illustrating the gradual increase of the yaw torque, or moment in operation of a hydraulic braking system in accordance with the present invention will be given. Let it be assumed that the vehicle wheels at the left side are on a smooth, iced surface, whereas the wheels at the right side are above dry asphalt road surface. The frictional coefficient between wheel and road surface on ice, that is at the left side, is approximately 0.1; at the right side, against asphalt, it is 0.9. Independent wheel anti-lock systems would control a braking pressure, for one type of system, for example, at the left side of about 10 atm, and at the right side of about 150 atm. If, however, the anti-lock system in accordance with the invention is used, that is, if the right and left sides are coupled together by a common pulse source 46, then, after response of the left anti-lock system 1 at the left side, the braking pressure at the right side can rise only gradually. In the present example, the mark-space ratio (duty cycle) of the pulse source 46 is so selected that the braking pressure increases by about 0.2 atm during each millisecond. At this rate, the braking pressure in the wheel cylinders at the right track will be changed from 10 atm to 150 atm only gradually, that is, during a time of about 700 milliseconds (.7 sec). This is sufficient time for the driver to counteract the slowly increasing tendency of the vehicle to swerve, that is, to counteract the slowly increasing yaw torque.

The further effect of the anti-lock system on the left wheel, with reference to FIG. 5, can now be readily described, after the effect of the system to counteract yaw or swerving has been explained.

The left system 1 will decrease the braking pressure, so that the braking torque or effort will decrease. The wheel acceleration changs in positive direction and will eventually pass the ON-level of the second threshold switch 40, set in the above example at 0g. FIG. 5 illustrates a circumferential speed of $+0.5 g$. in the third line thereof. The three threshold switches 39 to 41 now will have the following signals: 1; 0; 0. The first threshold switch 39 still provides a 1-signal to OR-gate 43 so that the solenoid 23 of valve 14 continues to be energized, and the AND-gate 43 will have a 1-signal applied. Upon response of the second threshold switch 40, the time of opening of the outlet valve 19, and thus the pressure drop is terminated. Both inlet as well as drain valves are now closed and the pressure in the brake cylinder remains constant.

Due to the low level of pressure which will result, the wheel will, however, continue to accelerate and its circumferential speed will eventually pass the limit of the third threshold switch of $+0.9g$. The result is indicated in the fourth line of FIG. 5. The wheel, as it continues to accelerate, will have a circumferential acceleration of $1.1g$ and the three threshold switches 39–41 will have these signals: 0; 1; 1; since, as the third threshold switch 41 responded when the threshold of $+0.9g$ was exceeded, the threshold switches 39, 40 had likewise changed their output signals upon exceeding of the threshold level of $+1.0g$.

The input to the AND-gate 42 will now have a 1-signal applied thereto and the drain valve 19 will remain closed. The third threshold switch 41 will provide a 1-signal to the OR-gate 43 which also holds the winding 23 of inlet valve 14 energized, and brake pressure will remain constant. This will cause the wheel acceleration to change in a negative direction, as soon as the circumferential speed of the wheel has approached the speed of the vehicle itself. This terminates the re-acceleration phase of the wheel. Since the vehicle is decelerated by the braking on the other wheels, the wheel acceleration will go negative even at low, even or uniform or constant brake pressure. The fifth line of FIG. 5 illustrates the condition which will pertain after the turn-OFF level of the third threshold switch 41 is reached. The value of −1.0g is selected for the wheel acceleration, as also seen in the first line of FIG. 5. The same switching and circuit conditions as in line 1, FIG. 5, will pertain with one exception however, which concerns the pulse source 46.

The difference with respect to the condition at the beginning of braking is this: Pulse source 46 will provide pulses to the OR-gate 43. Since the OR-gate 43 does not have on overriding 1-signal applied thereto, that is, to anyone of the other inputs, solenoid 23 of the inlet valve 14 is intermittently energized. This permits gradual rise of pressure in the wheel brake cylinder. The duty cycle, that is the mark-space ratio of the pulse source 46 determines the average opening time, that is the average supply of pressurized fluid to the brake wheel cylinder, and thus the slope or rate of increase of pressure. The mark-space ratio, or the ON-OFF ratio or duty cycle of the pulse source 46 must be matched to the type and weight of the vehicle.

The anti-lock control system permits braking pressure to increase only slowly, and in pulsed steps, in all following control cycles. The sequence of the various phases during any control cycle will remain the same: pressure rise, pressure drop, constant pressure, pressure rise..... .

Rapid braking is enabled only upon release of the brake pedal, and renewed operation of the brake pedal. This is controlled by the bistable FF 45. When the brake light switch 29 is closed, the input through the inverter stage 47 has a 1-signal applied thereto (switch 29 closed), the output providing a 0-signal, and bistable FF 45 will stay in its second stable state for the entire duration that the brake pedal is operated, providing pulsed output signals from source 46. Only release of the brake pedal, which opens the brake light switch 29 provides a re-set signal to the reset input R of bistable FF by applying a 1-signal thereto. Bistable FF changes over to its basic state and blocks acceleration of pulses from source 46.

Figure 3:
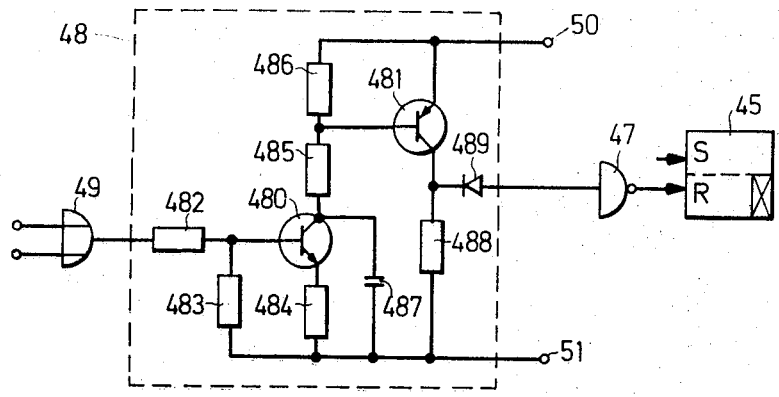
FIG. 3 is a schematic and partly detailed circuit diagram of a monitoring circuit to prevent extended dropping of braking pressure in case of defect in electrical switching components, typically the brake light switch of the vehicle.

FIG. 3 illustrates a circuit to ensure against defects in the brake light switch 29. A monitoring stage 48 is connected to the inverter 47, the monitoring stage 48 including a timing circuit. The input to the monitoring stage 48 includes an OR-gate 49 which is connected to the outputs of the first and third threshold switches 39, 41 (FIG. 1), respectively.

The monitoring stage 48 includes an npn transistor 480 and a pnp transistor 481. The base of the npn transistor 480 is connected over resistor 482 to the output of OR-gate 49 and over a resistor 483 to a negative supply bus 51. The emitter of transistor 480 is connected over transistor 484 to negative bus 51. The collector of transistor 480 is connected to a voltage divider formed of resistors 485, 486, resistor 486 being connected to positive supply bus 50. Further, a capacitor 487 connects the collector of transistor 480 to negative bus 51. The junction or tap point of the two resistors 485, 486 is connected to the base of transistor 481, the emitter of which is connected to positive bus 50 and the collector of which is connected over a resistor 488 to negative bus 51. Further, the collector of transistor 481 is connected to a diode 489, which, simultaneously, forms the output of the monitoring stage 48.

Operation:

In quiescent condition of the monitoring stage, the npn transistor 480 is blocked, since its base has negative potential applied thereto over resistor 483, likewise causing blocking of pnp transistor 481. Capacitor 487 is charged to the supply voltage. In quiescent condition, the monitoring stage 48 therefore provides over diode 489 a 0-signal to the inverter stage 47 which, in turn, will provide a 1-signal. Upon the response of the anti-lock system, the threshold switches 39, 41, in periodic sequence, will apply 0-signals and 1-signals to the OR-gate 49. The 1-signals cause the transistor 480 to become conductive, thus permitting discharge of capacitor 487 over resistor 484. Transistor 481 likewise becomes conductive so that diode 489 provides a 1-signal. During the control operation, the inverter stage 47 will thus provide a 0-signal. Upon termination of braking, neither of the threshold switches 39, 41 will provide a 1-signal to OR-gate 49, causing blocking of transistor 480 and permitting recharge of capacitor 487 over resistors 485, 486, at a slow rate. When the capacitor voltage has risen sufficiently high, transistor 481 blocks and the output signal of inverter stage 47 changes from 0 to 1, causing re-set of the bistable FF 45, and blocking of the pulse source 46.

Transistor 481, together with resistors 485, 486 and capacitor 487 forms a timing circuit which, for example, is set for a timing period of from 200 to 500 milliseconds. OR-gate 49 may be connected to more than two inputs, to which the inputs of various anti-lock control systems are connected. The bistable FF 45, in any one of the systems, can then be reset only when all anti-lock system have terminated their response cycles.

Low-pass filter 36 is provided to form an average value of the output voltage derived from the tachometer generator 32 (or an amplifier connected in series therewith), so that the output of the low pass filter 36 will have a d-c voltage which is representative of the vehicle circumferential velocity. The second low-pass filter 38 of a lower upper frequency value than low-pass filter 36 filters noise voltages and the like from the output signal of differentiator 37, and additionally effects a time delay of the output signal therefrom with respect to its input, that is, the output signal from differentiator 37. The second low-pass filter 38 is so arranged that the switches will respond to pressure drop with some time delay, but terminate pressure drop without time delay. This ensures that pressure in the brake line is not dropped due to a noise pulse, or a noise peak, not directly derived from changes sensed by differentiator 37. Noise voltages and noise peaks often arise in automotive electrical systems induced, for example, by other electrical components in the system, such as voltage regulators, the ignition system and the like.

The brake anti-lock system of the present invention effectively limits the yaw torque about the vertical axis of the vehicle so that, upon response of the anti-lock system, brake pressure on both sides can rise only slowly. Additionally, the system is economical in the use of components, since the same pulse source 46 can be used for two separate anti-lock systems, that is, for a system for the right side wheels and left side wheels of the vehicle, together. It is, of course, possible to utilize separate pulse sources 46 to control, separately, the anti-lock system at two sides of the vehicle. A vehicle may have a separate pulse source for any axle, or for any one of the wheels; in the latter case, the pulse source 46 controls four, or six (or more) anti-lock systems, whereas, when it is associated with vehicle axles, only two anti-lock systems are controlled. In any event, unsymmetrical road conditions are sensed, and yaw torque is effectively decreased.

Acceleration sensors may be used which include an inertia mass, in which the deflection of the inertia mass is sensed. Such acceleration sensors would then replace the electronic acceleration sensing, that is, all elements of the components 32–41, of the example described in connection with FIG. 2. The principle of the present invention may be used also with other circuits, and with circuit arrangements using different types of acceleration sensing techniques.

Various changes and modifications may be made within the scope of the inventive concept. If desired, additional control signals derived from sensing relative vehicle speed and wheel velocity may also be used to control the anti-lock system.

We claim:

1. Pressure fluid brake anti-lock system for vehicles having separate left and right braking systems at left and right sides of the vehicle comprising
    left and right inlet valves (14, 114) to admit pressurized brake fluid to left and right wheel brakes, respectively, and means (23, 123) respectively controlling operation of said valves;
    left and right drain valves (19, 119) to drain pressurized brake fluid from the left and right wheel brakes, respectively, and drain control means (25, 125) respectively controlling operation of the drain valves;
    left and right anti-lock control systems including left and right means (32-42; 132-142) to sense, respectively, left and right wheel rate-of-change of speed and independently controlling respective selective operation of said left valves and said right valves, in accordance with respective rate of change of wheel speed, to provide for independent control cycles including pressure rise and pressure drop in the respective left and right braking systems;
    said anti-lock system further comprising
    a pulse source (46);
    common means (44, 45) sensing deceleration of any one of the wheels above a predetermined limit, said common deceleration sensing means (44, 45) controlling connection (E; 43, 143) of said pulse source (46) to at least one of the valves associated with the brakes on the other side of the vehicle with respect to the side where deceleration above a predetermined limit has been sensed to permit only intermittent, pulsed, gradual increase of brake pressure at said other side of the vehicle after the common sensing means has sensed a wheel rate of change of speed of any one wheel indicative of imminent brake locking, and to control subsequent rate of pressure change in both systems by the pulses derived from said pulse source.

2. System according to claim 1 wherein said pulse source (46) is connected to intermittently energize the inlet valves of both said brake systems to permit flow of pressurized brake fluid to the respective brake only in intermittent pulses.

3. System according to claim 1 wherein the deceleration sensing means includes a bistable flip-flop (45) connected to control operation of the pulse source (46);
    and means (44) connected to have control inputs applied to said flip-flop (45) which are energized upon opening of any one of the drain valves (19, 119).

4. System according to claim 3 wherein the vehicle has a switch (29) operating upon operation of the brake control of the vehicle;
    and wherein the switch (29) is connected to the reset input of the flip-flop (45) to reset the flip-flop when the brake is not operated and the switch is open to thereby disable further operation of the pulse source (46).

5. System according to claim 3 comprising a fail-safe reset circuit (48) connected to the reset input of the flip-flop (45), the fail-safe reset circuit comprising
    a timing circuit (FIG. 3; 480, 484, 485, 487) connected to the rate-of-change sensing means associated with at least one of the wheels and starting a timing interval if the rate of change of speed of the respective wheel or wheels exceeded a predetermined level.

6. System according to claim 5 wherein the rate of change of speed sensing means comprises a plurality of threshold switches (39, 40, 41; 139, 140, 141) sensing different values of rate of change of wheel speed, said system further comprising
    a reset OR gate (49) having its input connected to at least two of said rate of speed change threshold sensors.

7. System according to claim 1 wherein the rate of speed change sensing means comprises
    a tachometer generator providing an output signal representative of wheel speed;
    a low pass filter means (36) connected to said tachometer generator to deliver a dc signal representative of wheel speed;
    a differentiator (37) connected to said low pass filter means to deliver a rate of change of speed signal;
    and at least one threshold switch (39) connected to the differentiator and responding to a predetermined value of wheel deceleration.

8. System according to claim 7 wherein said threshold switch has a switching hysteresis and changes state upon a first value of wheel deceleration, and then changes state back at a second value of wheel rate of change of speed.

9. System according to claim 7 wherein three threshold switches (39, 40, 41) are provided, the first threshold switch (39) responding to a high value of wheel deceleration (b1),
    the second threshold switch (40) responding to about zero rate of change of wheel speed (b2),
    and the third threshold switch (41) responding to wheel acceleration (b3), the second threshold switch (40) being connected to said differentiator (37);
    a second low pass filter (38) connected to said differentiator (37), the first and third threshold switches (39, 41) being connected to said second low pass filter (38).

10. System according to claim 1 wherein the note of speed change sensing means comprises
means deriving a signal representative of wheel rate of change speed;
and three threshold switches (39, 40, 41), the first threshold switch (39) responding to a high value of wheel deceleration (b1);
a second threshold switch (40) responding to about zero rate of change of wheel speed (b2);
and a third threshold switch (41) responding to a small value of wheel acceleration (b3).

11. System according to claim 10 further comprising a low pass filter (38) connected between the first and third threshold switches (39, 41) and the means deriving the rate of speed change signal.

12. System according to claim 10 further comprising an AND gate (42) connected to the output of the first and second threshold switches (39, 40) the output of the AND gate controlling the drain valve solenoid (25).

13. System according to claim 10 wherein the pulse source (46) is common to anti-lock systems at both sides of the vehicle and the inlet valves (14, 114) have operating solenoids (23, 123) and are normally open and close upon energization of the respective inlet solenoid (23, 123);
the drain valves (19, 119) have operating solenoids (25, 125) and are normally closed and open upon energization of the respective outlet solenoid (25, 125),
each said brake system further comprising
respective disjunctive logic gates (43, 143) connected in series with the respective inlet solenoid (23, 123);
each respective gate (43, 143) having applied thereto;
the output of the respective first and third threshold switches (39, 41; 139, 141);
the output of the common pulse source (46);
and a signal indicative of energization of the respective drain valve solenoid (25, 125) to permit independent operation of the respective inlet valve solenoid (23, 123), and to interlock the respective solenoids of the respective inlet valves of the drain valves.

14. System according to claim 1 wherein the pulse source (46) is common to respective anti-lock systems at both sides of the vehicle, and the inlet valves (14, 114) are normally open, and the drain valves (19, 119) are normally closed, and each of said brake systems further comprises
respective disjunctive logic gates (43, 143) connected in series with the respective inlet solenoid (23, 123);
each respective gate (43, 143) having applied thereto;
a signal representative of the respective wheel speed rate of change;
the output of the pulse source (46);
and a signal indicative of opening of the respective drain valve (19, 119), to permit independent operation of the respective inlet valve (14, 114) and interlock the respective drain valve (19, 119) and the inlet valve (14, 114).

15. Pressure fluid brake anti-lock system for vehicles having separate left and right braking systems at left and right sides of the vehicle comprising left and right inlet valves (14, 114) to admit pressurized brake fluid to left and right wheel brakes, respectively;
left and right drain valves (19, 119) to drain pressurized brake fluid from the left and right brakes;
left and right means (23, 25; 123, 125) controlling, selectively, closing of said left and right inlet valves and opening of said left and right drain valves;
left and right wheel brake anti-lock control systems including left and right means (32-42; 132-142) to sense, respectively, left and right wheel rate-of-change of speed and independently controlling respective selective operation of said left valves and of said right valves in accordance with respective rates of change of wheel speed, to provide for independent control cycles of application of braking fluid pressure to the left and right brakes, respectively, and to control pressure maintenance and pressure drop in said respective brakes;
respective separate left and right logic gates (43, 143) controlling closing of the respective left and right inlet valves (14, 114), connected to and controlled by the respective left and right control systems;
a pulse source (46);
common means (44, 45) including a controlled switch (45) connected to the wheel speed rate-of-change sensing means of the left control system as well as of the right control system, and sensing deceleration of any one of the wheels above a predetermined limit, indicative of imminent locking of the respective wheel, said switch (45) changing from a first to a second state upon sensing deceleration above said limit,
said switch (45) being connected to and, upon change to the second state, controlling connection of said pulse source (46) additionally to all of the logic gates (43, 143) to provide pulses tending to close all the inlet valves in pulsed steps independently of sensing of deceleration above said limit by a a control system other than the control system which has first sensed said deceleration above said limit, thereby inhibiting steep pressure rise in the brake at the side of the vehicle where the respective system has not sensed deceleration above said limit;
said vehicle further having a switch (29) operating upon operation of the brake control of the vehicle, said switch (29) being connected to said controlled switch (45) to reset said switch to the first state when the brake is not operated to thereby prevent connection of said pulse source to said disjunctive gates upon release of the brake, and re-connection unless one of the anti-lock control systems senses deceleration of any one wheel above said limit.

16. System according to claim 15, wherein a single pulse source (46) is provided, said pulse source controlling pulsed closing of the inlet valves through all said logic gates (43, 143).

17. System according to claim 15, wherein the controlled switch comprises a flip-flop (45), said left and right control systems each include threshold switches sensing deceleration of the respective left and right wheels, the brakes of which are controlled, above said predetermined limit, said flip-flop (45) being connected to said threshold switches and being set upon response of any one of said threshold switches;

the brake switch (29) being connected to reset the flip-flop when the brake control for the vehicle is in released, inoperated condition.

18. System according to claim 15, wherein the means controlling the respective inlet valves comprises a respective left and right inlet solenoid (23, 123), and the means controlling the respective drain valves comprise respective left and right drain solenoids (25, 125);

said respective control means causing opening of the respective drain valve when wheel deceleration above the predetermined limit is sensed, all said drain valve solenoids (25, 125) being connected to said common means (44, 45) to control change of state of said switch (45) when one of said drain valve solenoids is energized, thus connecting said pulse source (46) to all said inlet pressure valve solenoids (23, 123), and prevent unmodified application of full brake fluid pressure to the wheels having control systems associated therewith which have not sensed wheel deceleration above said predetermined limit.

* * * * *